United States Patent [19]

Evans et al.

[11] 4,201,912
[45] May 6, 1980

[54] SUBTHRESHOLD NEUTRON INTERROGATOR FOR DETECTION OF RADIOACTIVE MATERIALS

[75] Inventors: Michael L. Evans; Howard O. Menlove; Michael P. Baker, all of Los Alamos, N. Mex.

[73] Assignee: The United States of America as represented by the United States Department of Energy, Washington, D.C.

[21] Appl. No.: 948,266

[22] Filed: Oct. 3, 1978

[51] Int. Cl.² .............................................. G01V 5/00
[52] U.S. Cl. ................................... 250/253; 250/270
[58] Field of Search ............... 250/253, 265, 267, 269, 250/270

[56] References Cited

U.S. PATENT DOCUMENTS

| | | | |
|---|---|---|---|
| 2,726,338 | 12/1955 | Goodman | 250/269 |
| 2,842,695 | 7/1958 | Goodman | 250/261 |
| 2,920,204 | 1/1960 | Youmans | 250/265 |
| 3,707,631 | 12/1972 | Untermyer | 250/363 R |
| 3,828,189 | 8/1974 | Givens | 250/253 |

Primary Examiner—Alfred E. Smith
Assistant Examiner—Janice A. Howell
Attorney, Agent, or Firm—R. V. Lupo; Paul D. Gaetjens; William W. Cochran, II

[57] ABSTRACT

A device for detecting fissionable material such as uranium in low concentrations by interrogating with photoneutrons at energy levels below 500 keV, and typically about 26 keV. Induced fast neutrons having energies above 500 keV by the interrogated fissionable material are detected by a liquid scintillator or recoil proportional counter which is sensitive to the induced fast neutrons. Since the induced fast neutrons are proportional to the concentration of fissionable material, detection of induced fast neutrons indicate concentration of the fissionable material.

28 Claims, 2 Drawing Figures

SUBTHRESHOLD NEUTRON INTERROGATOR FOR DETECTION OF RADIOACTIVE MATERIALS

BACKGROUND OF THE INVENTION

The present invention pertains generally to nuclear materials and more specifically to devices and methods for determining concentrations of fissionable material, particularly within boreholes.

Prior art techniques of borehole logging for uranium ore have primarily utilized passive gamma ray detection. The disadvantage of the passive detection method is that radioactive decay products from the uranium which emit gamma ray signals are measured rather than measuring the uranium directly. Since these gaseous decay products are oftentimes not in equilibrium with concentrations of uranium ore due to physical migration, assay results can be misleading.

To overcome these disadvantages of the passive technique of detection, active interrogation methods have been developed for direct measurements of concentrations of uranium ore in logging operations. A typical prior art active interrogation device utilizes neutron generation tubes or radioactive $^{252}$Cf as a neutron source for interrogation of the uranium ore. These prior art devices interrogate the uranium ore with neutrons having energies of approximately 500 keV and greater to induce neutrons from the uranium ore for detection by a detector in the probe. Since the induced neutrons have energies of approximately 500 keV to 3 MeV, the $^{252}$Cf interrogation source completely obscures detection of the induced neutrons during irradiation by the interrogation source. Consequently, the interrogation source must be pulsed or modulated to make it possible to measure the time delayed induced neutrons from the uranium ore. Pulsing of the source requires elaborate electrical or electromechanical devices within the probe which are expensive to implement and somewhat unreliable. Moreover, $^{252}$Cf requires extensive shielding for personnel safety and requires special handling techniques in the field.

To overcome these problems of shielding and possible radioactive contamination, DT sources have been used as the interrogation source in some prior art logging probes. However, these interrogation sources are extremely expensive and have a very short operating life, and are consequently, expensive to operate.

SUMMARY OF THE INVENTION

The present invention overcomes the disadvantages and limitations of the prior art by providing a subthreshold neutron interrogator for detection of fissionable materials. According to the present invention, an interrogation source produces low energy neutrons which interrogate fissionable material to induce fast neutrons which are detected by a fast neutron detector within the probe. Since the interrogation source produces neutrons below the sensitivity range of the fast neutron detector, the interrogation source does not interfere with detection of induced fast neutrons. Additionally, the interrogation source comprises an inexpensive gamma ray source which is disposed within a Be sleeve to produce photoneutrons in response to gamma ray radiation. This minimizes personnel hazards since the photoneutron interrogation source is neutron inactive until the gamma ray source is employed. Of course, the gamma ray source is shielded for personnel safety.

It is therefore an object of the present invention to provide a subthreshold neutron interrogator probe for detection of fissionable materials.

It is also an object of the present invention to provide an interrogation probe for directly detecting the presence of fissionable material.

Another object of the present invention is to provide a device for interrogating and detecting induced fast neutrons from low concentrations of fissionable material.

Another object of the present invention is to provide a device for detecting fissionable material which is reliable in operation.

Another object of the present invention is to provide a device for detecting fissionable material which is simple and inexpensive to implement.

Another object of the present invention is to provide a device for detecting fissionable material which is capable of operating for extended periods.

Other objects and further scope of applicability of the present invention will become apparent from the detailed description given hereinafter. The detailed description, indicating the preferred embodiment of the invention, is given only by way of illustration since various changes and modifications within the spirit and scope of the invention will become apparent to those skilled in the art from this detailed description.

The foregoing Abstract of the Disclosure is for the purpose of providing a nonlegal brief statement to serve as a searching and scanning tool for scientists, engineers and researchers and is not intended to limit the scope of the invention as disclosed herein, nor is it intended to be used in interpreting or in any way limiting the scope or fair meaning of the appended claims.

DETAILED DESCRIPTION OF THE PREFERRED EMBODIMENT OF THE INVENTION

Figure 1:
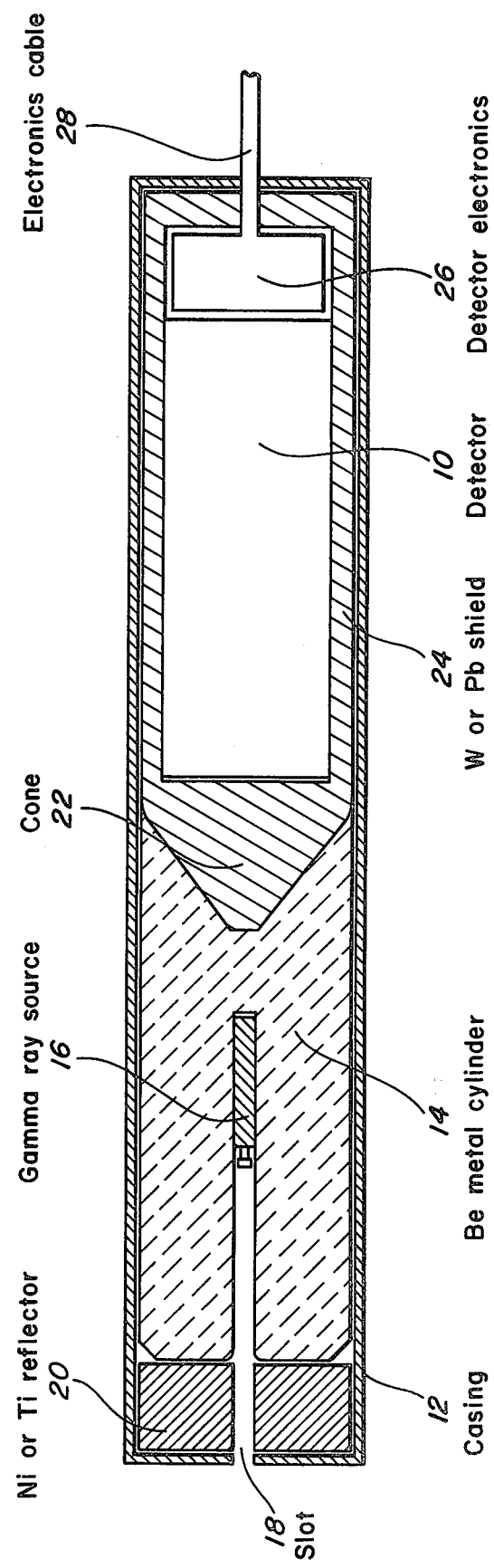
FIG. 1 is a schematic diagram of the interrogation probe comprising the preferred embodiment of the invention.

FIG. 1 discloses the interrogation probe comprising the preferred embodiment of the invention. The principle of the invention is to induce fission reactions in $^{235}$U surrounding a borehole with a subthreshold neutron source. An interrogation source in the probe produces neutrons with energies less than approximately 500 keV, and typically 26 keV, while simultaneously counting induced fission spectrum neutrons having energies above approximately 500 keV and typically from 500 keV to 3 MeV, with a fast neutron detector 10. Fast neutron detector 10 is energy biased to count only neutrons with energies greater than approximately 500 keV, to minimize interference from the interrogation source.

The probe, as shown in FIG. 1, consists of a casing 12 which is fabricated from stainless steel or other noncorrosive metal. Photoneutrons are produced by a Be metal cylinder when gamma ray source 16 is disposed within slot 18 of the Be metal cylinder 14. The interrogation source can therefore be inactivated by removing the gamma ray source 16 from the Be metal cylinder 14. This provides a convenient method for producing photoneutrons which eliminates the necessity for extensive shielding prior to deposition in the borehole, since the removable gamma ray source requires minimal shielding.

Ni or Ti reflector 20 functions to reflect neutrons generated within the Be metal cylinder 14 into material surrounding the borehole adjacent to the detector 10. Similarly, the cone section 22 of W or Pb shield 24 is tapered to also emit neutrons from the interrogation source into material surrounding the borehole adjacent to detector 10 while shielding detector 10 from the source gamma rays. Detector electronics 26, which are also disposed within the protective W or Pb shield 24, translate signals from detector 10 into electronic pulses which are transmitted out of the borehole via electronics cable 28.

Depending upon the type of detector 10 utilized, detector electronics 26 can perform various functions. The various types of photoneutron detectors 10 which can be utilized can be specified in two general categories: 1) recoil proportional counters; 2) liquid scintillators. Examples of detectors which can be used in the first category include $^4$He (helium-4), $H_2$ (hydrogen), or $CF_4$ (methane) gases at high pressures. Sealed units of these types can be obtained from Reuter-Stokes, 18530 South Miles Parkway, Cleveland, Ohio 44128. Examples of detectors from the second category include organic scintillator solutions, such as the units referred to as NE 218 and NE 213 which can be obtained from Nuclear Enterprises, Inc., 931 Terminal Way, San Carlos, Calif. 94070. These organic scintillator solutions must be optically coupled to a photomultiplier tube which can be obtained commerically from electronics companies such as RCA. Additionally, since liquid scintillators are somewhat sensitive to gamma ray radiation and low energy neutrons such as produced by the neutron interrogation source, discrimination circuitry can be included within the detection electronics 26. Examples of typical circuitry include a zero-crossing device such as disclosed by V. V. Verbinski et al. appearing in Nuclear Instruments and Methods, 65, p. 8, (1968), and a dual ADC device such as disclosed by C. L. Morris et al. in Nuclear Instruments and Methods, 137, p. 397, (1976).

Figure 2:
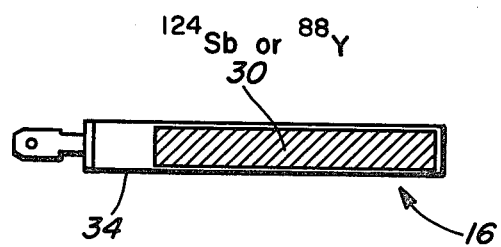
FIG. 2 is a schematic drawing of a representative gamma ray source for use with the preferred embodiment of the invention.

FIG. 2 discloses an example of a typical gamma ray source 16. The source illustrated in FIG. 2 has either a $^{88}$Y or a $^{124}$Sb core which is embedded in a metal sheath. These materials are embedded within an outer casing which is capable of safely retaining these materials for numerous halflife intervals. The manner in which these gamma ray sources are produced is disclosed in Los Alamos Progress Report LA-6996-PR, pages 13–15, LA-7139-PR, pages 20–21, and LA-7251-PR, pages 6–8, copies of which are available at the Library of Congress.

The present invention therefore provides a device which can directly measure fissionable material within a borehole on a continuous basis by the use of a sub-threshold neutron interrogation source. Induced fast neutron activity from the fissionable material surrounding the borehole is counted during the entire measurement period including the irradiation interval. The advantage of measuring on a continuous basis is the simplicity of counting the direct fission neutron yield without the necessity of timing or pulsing devices, and the high yield ratio (200/1) of fission neutrons during the irradiation period, relative to delayed neutrons measured by typical prior art modulated probes. Moreover, the interrogation source is inactive when the gamma ray source 16 is removed from the Be metal cylinder 14 so that the probe can be handled without awkward neutron shielding. As a result, the entire device is smaller and less costly, more reliable and operates over longer periods than prior art direct uranium logging tools.

Obviously many modifications and variations of the present invention are possible in light of the above teachings. It is therefore to be understood that within the scope of the appended claims, the invention may be practiced otherwise than as specifically described, and that subject matter disclosed herein shall not be precluded from being later claimed in the present application or a continuation, a continuation-in-part, or reissue application.

What we claim is:

1. An interrogation device for detecting the presence of fissionable material comprising:
   interrogation means for producing a continuous source of photoneutrons at energy levels below 500 keV;
   means for continuously detecting induced fast neutrons produced by interrogated fissionable material at energy levels above 500 keV.

2. The interrogation device of claim 1 wherein said interrogation means comprises:
   a removable source of gamma ray radiation;
   means for generating a continuous source of photoneutrons at energies
   below 500 keV in response to gamma ray radiation produced by said removable source.

3. The interrogation device of claim 1 wherein said means for detecting induced fast neutrons comprises a liquid scintillator.

4. The interrogation device of claim 1 wherein said means for detecting induced fast neutrons comprises a recoil proportional counter.

5. The interrogation device of claim 4 wherein said recoil proportional counter comprises a pressurized $^4$He gas detector.

6. The interrogation device of claim 4 wherein said recoil proportional counter comprises a pressurized $H_2$ gas detector.

7. The interrogation device of claim 4 wherein said recoil proportional counter comprises a pressurized $CH_4$ gas detector.

8. The interrogation device of claim 1 further comprises a radiation shield disposed between said interrogation means and said means for detecting.

9. The interrogation device of claim 1 wherein said fissionable material comprises $^{235}$U.

10. A device for interrogating and detecting induced fast neutrons from low concentrations of fissionable material comprising:
    a gamma ray source;
    means for continuously producing a continuous source of photoneutrons having energies below 500 keV in response to gamma rays produced by said gamma ray source;
    means for detecting neutrons having energies above 500 keV induced from said fissionable material by said photoneutrons having energies below 500 keV.

11. The device of claim 10 wherein said gamma ray source comprises $^{124}$Sb.

12. The device of claim 10 wherein said gamma ray source comprises $^{88}$y.

13. The device of claim 10 wherein said means for producing photoneutrons comprises a Be sleeve.

14. The device of claim 10 wherein said means for detecting neutrons comprises a liquid scintillator.

15. The device of claim 10 wherein said means for detecting neutrons comprises a recoil proportional counter.

16. The device of claim 15 wherein said recoil proportional counter comprises a pressurized $^4$He gas detector.

17. The device of claim 15 wherein said recoil proportional counter comprises a pressurized $H_2$ gas detector.

18. The device of claim 15 wherein said recoil proportional counter comprises a pressurized $CH_4$ gas detector.

19. The device of claim 10 wherein said fissionable material comprises $^{235}$U.

20. A device for detecting the presence of fissionable material by interrogating said fissionable material and detecting induced fast neutrons from said fissionable material comprising:
   a removable gamma ray source;
   Be metal means surrounding said removable gamma ray source for continuously producing photoneutrons below 500 keV in response to gamma rays produced by said gamma ray source;
   means for detecting said induced fast neutrons above 500 keV;
   shielding means for deflecting gamma rays and photoneutrons away from said means for detecting, said shielding means disposed between said Be metal means and said means for detecting;
   reflector means for directing said photoneutrons into material adjacent said means for detecting;
   detector electronics for translating data of induced fast neutrons into electrical pulses.

21. The device of claim 20 wherein said gamma ray source comprises $^{124}$Sb.

22. The device of claim 20 wherein said gamma ray source comprises $^{88}$Y.

23. The device of claim 20 wherein said means for detecting neutrons comprises a liquid scintillator.

24. The device of claim 20 wherein said means for detecting neutrons comprises a recoil proportional counter.

25. The device of claim 24 wherein said recoil proportional counter comprises a pressurized $^4$He gas detector.

26. The device of claim 24 wherein said recoil proportional counter comprises a pressurized $H_2$ gas detector.

27. The device of claim 24 wherein said recoil proportional counter comprises a pressurized $CH_4$ gas detector.

28. The device of claim 20 wherein said fissionable material comprises $^{235}$U.

* * * * *